US012039793B2

(12) United States Patent
Chan

(10) Patent No.: US 12,039,793 B2
(45) Date of Patent: Jul. 16, 2024

(54) AUTOMATIC ARTIFICIAL REALITY WORLD CREATION

(71) Applicant: Meta Platforms Technologies, LLC, Menlo Park, CA (US)

(72) Inventor: Chun-Wei Chan, Foster City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 196 days.

(21) Appl. No.: 17/689,164

(22) Filed: Mar. 8, 2022

(65) Prior Publication Data

US 2023/0144893 A1    May 11, 2023

Related U.S. Application Data

(60) Provisional application No. 63/277,655, filed on Nov. 10, 2021.

(51) Int. Cl.
*G06T 19/20*     (2011.01)
*G06T 7/55*      (2017.01)
(Continued)

(52) U.S. Cl.
CPC .............. *G06V 20/647* (2022.01); *G06T 7/55* (2017.01); *G06T 7/74* (2017.01); *G06T 11/001* (2013.01);
(Continued)

(58) Field of Classification Search
CPC ............ G06T 7/55; G06T 15/04; G06T 19/20
See application file for complete search history.

(56) References Cited

U.S. PATENT DOCUMENTS 10,237,675 B1    3/2019   Valavanis
10,586,369 B1    3/2020   Roche et al.
(Continued)

FOREIGN PATENT DOCUMENTS

KR    102204027 B1    1/2021
KR    102275906 B1    7/2021
(Continued)

OTHER PUBLICATIONS

International Search Report and Written Opinion for International Application No. PCT/US2022/049030, dated Mar. 6, 2023, 11 pages.
(Continued)

*Primary Examiner* — Matthew Salvucci
(74) *Attorney, Agent, or Firm* — Potomac Law Group, PLLC; Dannon G. Allbee

(57) ABSTRACT

Methods and systems described herein are directed to creating an artificial reality environment having elements automatically created from source images. In response to a creation system receiving the source images, the system can employ a multi-layered comparative analysis to obtain virtual object representations of objects depicted in the source images. A first set of the virtual objects can be selected from a library by matching identifiers for the depicted objects with tags on virtual objects in the library. A second set of virtual objects can be objects for which no candidate first virtual objects was adequately matched in the library, prompting the creation of a virtual object by generating depth data and skinning a resulting 3D mesh based on the source images. Having determined the virtual objects, the system can compile them into the artificial reality environment according to relative locations determined from the source images.

17 Claims, 14 Drawing Sheets

(51) Int. Cl.
  *G06T 7/73* (2017.01)
  *G06T 11/00* (2006.01)
  *G06T 15/04* (2011.01)
  *G06V 10/74* (2022.01)
  *G06V 20/64* (2022.01)

(52) U.S. Cl.
  CPC .............. *G06T 15/04* (2013.01); *G06T 19/20* (2013.01); *G06V 10/74* (2022.01); *G06T 2207/10016* (2013.01); *G06T 2207/10024* (2013.01); *G06T 2207/20081* (2013.01); *G06T 2219/004* (2013.01); *G06T 2219/2008* (2013.01)

(56) References Cited

U.S. PATENT DOCUMENTS

| | | | |
|---|---|---|---|
| 10,839,481 | B1 | 11/2020 | Chen |
| 11,113,859 | B1 | 9/2021 | Tong et al. |
| 11,521,189 | B1* | 12/2022 | Gordon ............ G06Q 20/40145 |
| 2005/0249367 | A1 | 11/2005 | Bailey |
| 2008/0005702 | A1 | 1/2008 | Skourup et al. |
| 2008/0100570 | A1 | 5/2008 | Friedrich et al. |
| 2012/0206452 | A1 | 8/2012 | Geisner et al. |
| 2013/0041648 | A1 | 2/2013 | Osman |
| 2013/0044129 | A1 | 2/2013 | Latta et al. |
| 2014/0233917 | A1 | 8/2014 | Xiang |
| 2014/0310595 | A1 | 10/2014 | Acharya et al. |
| 2014/0328505 | A1 | 11/2014 | Heinemann et al. |
| 2014/0362110 | A1 | 12/2014 | Stafford |
| 2014/0375691 | A1 | 12/2014 | Kasahara |
| 2015/0097862 | A1 | 4/2015 | Reisner-Kollmann et al. |
| 2015/0379770 | A1 | 12/2015 | Haley, Jr. et al. |
| 2016/0217590 | A1* | 7/2016 | Mullins ..................... G06T 7/40 |
| 2018/0284955 | A1 | 10/2018 | Canavor et al. |
| 2018/0324539 | A1 | 11/2018 | Lovitt |
| 2019/0278204 | A1 | 9/2019 | Nanjo |
| 2019/0304191 | A1 | 10/2019 | Hsu |
| 2020/0005544 | A1 | 1/2020 | Kim |
| 2020/0042083 | A1 | 2/2020 | Min |
| 2020/0211512 | A1 | 7/2020 | Sztuk et al. |
| 2021/0192684 | A1 | 6/2021 | Pardeshi et al. |
| 2021/0195360 | A1 | 6/2021 | Leider et al. |
| 2021/0287430 | A1 | 9/2021 | Li et al. |
| 2022/0277489 | A1* | 9/2022 | Ali ........................... G06T 7/97 |

FOREIGN PATENT DOCUMENTS

| | | |
|---|---|---|
| WO | 2016153628 A2 | 9/2016 |
| WO | 2016153628 A3 | 12/2016 |

OTHER PUBLICATIONS

International Search Report and Written Opinion for International Application No. PCT/US2023/013013, dated Apr. 24, 2023, 11 pages.

International Search Report and Written Opinion for International Application No. PCT/US2023/013020, dated May 31, 2023, 11 pages.

Kim K., et al., "Painting Outside as Inside: Edge Guided Image Outpainting via Bidirectional Rearrangement with Progressive Step Learning," arxiv.org, Nov. 9, 2020, 9 pages.

Singh R. D., et al., "3D Convolutional Neural Network for Object Recognition: A Review," Multimedia Tools and Applications, vol. 78, No. 12, Dec. 11, 2018, pp. 15951-15995.

International Preliminary Report on Patentability for International Application No. PCT/US2016/017974, dated Sep. 8, 2017, 8 Pages.

International Search Report and Written Opinion for International Application No. PCT/US2016/017974, dated Nov. 16, 2016, 9 Pages.

Non-Final Office Action dated Oct. 3, 2022 for U.S. Appl. No. 17/483,448, filed Sep. 23, 2021, 15 pages.

OPENCV, "Finding Contours in your Image," [Retrieved on Sep. 20, 2022], 2 pages, Retrieved from the Internet: URL: https://docs.opencv.org/3.4/df/d0d/tutorial_find_contours.html.

Wikipedia, "Surface of Revolution," [Retrieved on Sep. 20, 2022], 5 pages, Retrieved from the Internet: URL: https://en.wikipedia.org/wiki/Surface_of_revolution.

* cited by examiner ated Apr 30, 2016.  
AUTOMATIC ARTIFICIAL REALITY WORLD CREATION

CROSS-REFERENCE TO RELATED APPLICATION

This application claims priority to U.S. Provisional Patent Application No. 63/277,655, filed Nov. 10, 2021, titled "Automatic Virtual Reality World Creation from Images," which is herein incorporated by reference in its entirety.

TECHNICAL FIELD

The present disclosure is directed to artificial reality environment creation by analyzing one or more source images and automatically creating corresponding elements in the artificial reality environment.

BACKGROUND

In an artificial reality environment, some or all of the objects a user sees and interacts with are "virtual objects," i.e., representations of objects generated by a computing system that appear in an environment. Virtual objects in an artificial reality environment can be presented to the user by a head-mounted display, a mobile device, a projection system, or another computing system. Often, users can interact with virtual objects using controllers and/or gestures. For example, user "interactions" with virtual objects can include selecting, moving, rotating, resizing, actuating controls, changing colors or skins, defining interactions between real or virtual objects, setting virtual forces to act on virtual objects, or any other action on or change to an object that a user can imagine.

Operating within an artificial reality environment can allow a user to experience places and events for which the user might not otherwise be presented an opportunity. Additionally, the artificial reality environment can provide a user the option of customizing one or more experiences such that a presentation for places and events can be adapted according to personal preference (i.e., perceived from a certain perspective defined by timeframe, architectural style, etc.). For instance, adaptation in this manner can afford the user an ability to interact with the environment so that a perspective desired by the user for those places and events can be achieved.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
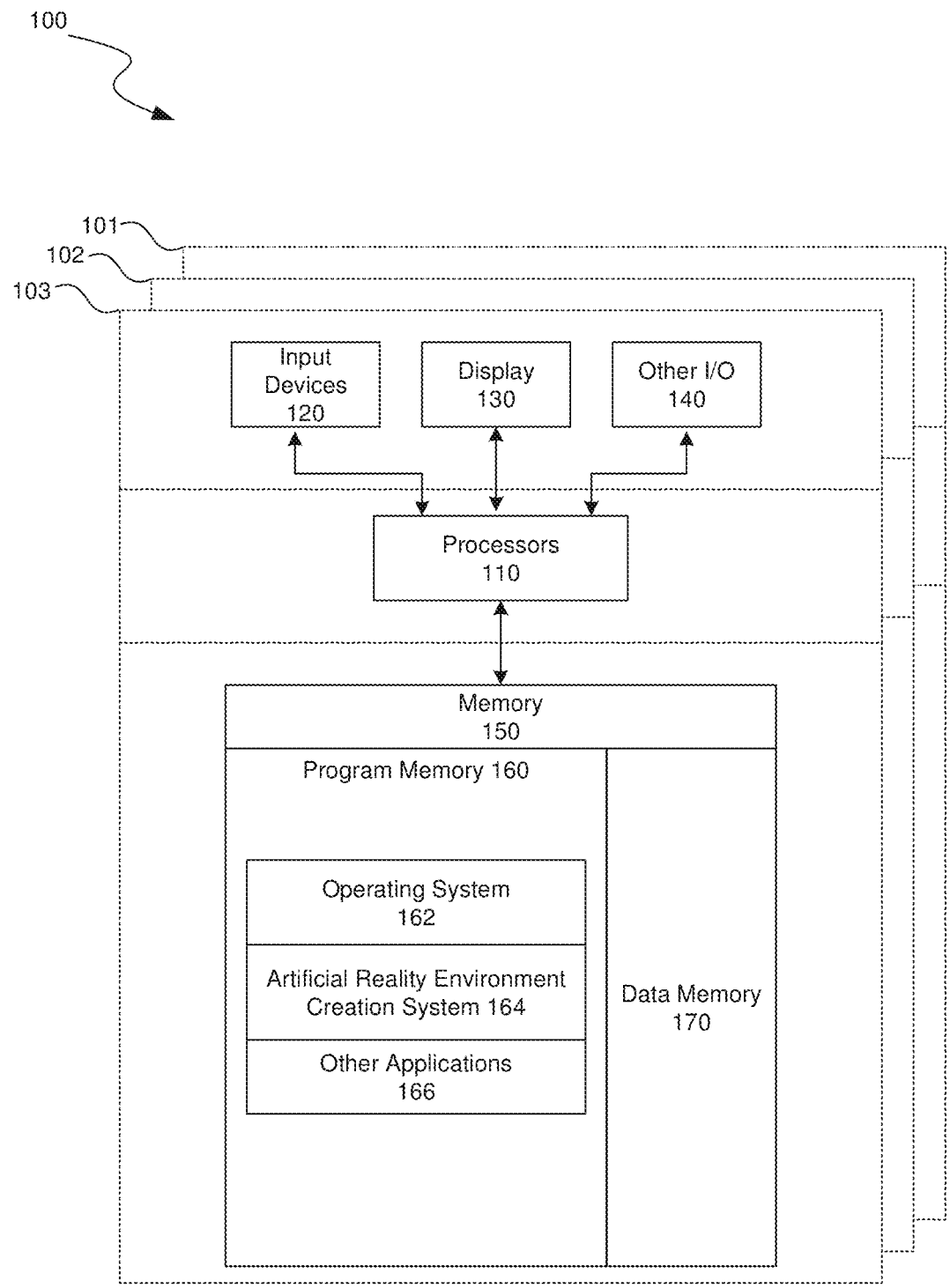
FIG. 1 is a block diagram illustrating an overview of devices on which some implementations of the present technology can operate.

Aspects of the present disclosure are directed to creating an artificial reality environment by analyzing one or more source images and automatically creating corresponding elements in the artificial reality environment. An artificial reality environment creation system (hereinafter "creation system") can retrieve one or more source images for real objects, where a user of the creation system has permissioned that retrieval. An "object," as used herein, can refer to any thing that can be shown visually (e.g., people, places, things, etc.), and can be real or virtual. Using the retrieved one or more source images, the creation system can generate a plurality of virtual objects approximating real objects for the one or more source images. The approximation can be made by the creation system employing at least a pair of machine learning models. In particular, the creation system can implement a first machine learning model to generate object identifiers for real objects, and can compare those identifiers to virtual objects of a virtual object library. In response to the creation system determining an object identifier-virtual object match, the matching virtual object can be selected as a first virtual object for a corresponding real object. In a case in which an object identifier-virtual object match cannot be achieved for a corresponding real object, the creation system can create a respective second virtual object. To do so, the creation system can (a) generate a 3D model for such a second virtual object by implementing a second machine learning model to approximate depth for a corresponding real object, (b) generate a texture for the second virtual object using portions of a source image or images corresponding to the real object, and (c) apply the generated texture to the generated 3D model. Once sufficient first and/or second virtual objects accounting for each of the real objects of the source image or images have been supplied, the creation system can determine their relative locations and compile them into an artificial reality environment. For instance, such an environment can include the first and second virtual objects, positioned according to their determined relative locations, and having a style applied defined by corresponding source images for the objects. Alternatively, such an environment can adapt the objects to a user-selected style. In some implementations, the created artificial reality environment can include one or more other virtual objects not represented in the source image or images—e.g., from user selections and/or through selections that go with a theme of the depicted objects.

In some implementations, the retrieved one or more source images defining the discussed real objects for which virtual objects are generated can be variously sourced. For example, the images can be defined by one or more of a picture, a video, a drawing, a brainwave, a textual description, etc. In view of such a variety of image sources, a user of the creation system can experience an artificial reality environment that can be almost entirely without limitation. Further, the user need not have special scripting, 3D modeling, or other technical skills to create an artificial reality environment, she only needs to provide the relevant image(s).

In some implementations, the retrieved one or more source images can be manually or automatically uploaded to the creation system from a variety of sources. In this regard, a user of the creation system can permission image retrieval from devices such as the user's cellphone, computer, vehicle, home entertainment system, from a cloud source (e.g., a social media platform, provided URL, or cloud storage service), etc. Alternatively or in addition, a user can draw an image which can be retrieved by the creation system. As such, the breadth of source images for which the user can employ the creation system to generate an artificial reality environment can be narrowed or expanded depending upon the content of a selected one or more image sources. In yet further cases, the user can supply a description that the creation system can match to existing images in an image search.

In some implementations, the creation system can implement a first machine learning model to generate object identifiers for objects depicted in the one or more retrieved source images. To do so, the first machine learning model can be trained to match objects in the images to corresponding object identifiers for those objects. The first machine learning model can be trained using training data where the object identifiers are determined from a multitude of prior training images according to, for example, labels for objects in those images. That is, the training data can include matching pairs of objects and object identifiers, where the pairs are a result of comparison between a type of object in a prior training image and characteristics defining the object. Each pair of an object and object identifier can be applied to a model, with images defining the object(s) as input, predicted object identifiers compared to the actual objects, and, based on the comparison, model parameters updated thereby training the model. Once the first machine learning model is trained, it can be used to generate object identifiers objected depicted in new instances of images.

Using the generated object identifiers, the creation system can search a virtual object library to determine whether any of its included virtual objects match one or more of the object identifiers. If a match is found, the creation system can select the matching virtual object as a "first virtual object" representing a real object for a source image from which a corresponding object identifier was generated.

If a matching virtual object for one or more real objects cannot be found according to an object identifier-virtual object comparison of objects within the virtual object library, the creation system can further generate a corresponding virtual object (a "second virtual object"). That is, such second virtual objects can be generated for those one or more real objects that did not correspond to a selected one or more first virtual objects.

In some implementations, the creation system can create the second virtual objects by generating a 3D model for those objects, generating a texture for the same, and applying the texture to the 3D model. To generate the 3D model, the creation system can implement a second machine learning model trained to predict depth for real objects to be represented by the created second virtual objects. In some cases, depth data can be included in the image, in which case no depth estimation may be needed or may only be needed for portions of the object occluded in the image(s). Here, the second machine learning model can be trained using training data where the depth profiles for real objects can be determined from a multitude of prior training images. That is, the training data can include matching pairs of flat images of objects and depth profiles for those objects, where the training pairs include a first image of an object taken with a traditional camera and a second image captured of the same object from the same perspective with a depth-enabled camera. Alternatively, the depth-enabled camera can be used to obtain each of the first image and the second image, where depth channels are removed for the first (flat) image. Each pair of flat image and depth image (output comparison factor) can be applied to a model, with the flat images as input and depth images compared to the predicted depths from the model and, based on the comparison, model parameters updated to train the model. Once the second machine learning model is trained, it can be used to generate depth profiles for new images of objects from images.

After having acquired generated depth profiles for second virtual objects, which can be representative of real objects not corresponding to one or more selected first virtual objects for source images, the creation system can use the depth data to generate a 3D model. This can include converting depth data (i.e., distances from the capturing camera) to a 3D mesh, such as by defining curves and planes in a 3D mesh that connect points at the given depths. In some implementations, the creation system can use the depth data to complete the 3D mesh for recognized and unrecognized image objects (e.g., completing a back perspective for a corresponding known or unknown front view). The creation system can then generate one or more textures to be applied to the 3D model based on the coloring from the corresponding portions of the image that were used to create the 3D model. Referred to a "skinning," the creation system can thus skin the 3D model with the colors and textures from the image corresponding to the created second virtual object.

In some implementations, the creation system can apply a style for the first and/or second virtual objects. The style can represent a desired perspective in which the virtual objects are to be viewed and/or understood. In this regard, the style can represent, for example, an emotion, a range of emotions, an architectural style, a design or drawing style (e.g., cartoon, angular, Pointillism, etc.), a time period to be expressed by the objects, etc. In some implementations, the style can be a style which was originally presented by one or more of the source images corresponding to the first and/or second virtual objects. In other implementations, the style can be a user-selected style. This way, the user can adapt a generated artificial reality environment to reflect a desired scenario for the first and/or second virtual objects. For instance, such a scenario can include a vacation, a dream, medieval times, a birthday party, etc. Applying the style can include selection of an existing version of the object in that style or applying a filter to the object to modify it to be in that style.

After having determined the first and/or second virtual objects, the creation system can determine their relative locations in an artificial reality environment which is to be generated. For example, the locations can be determined from one or more source images with relative positions of depicted objects. In some implementations, the locations can be determined, for example, by analyzing relative placement for those depicted objects in multiple photographs or between multiple video frames. In some implementations, the locations can be determined by using content item metadata (e.g., GPS coordinates, city name, etc.) associated with the one or more source images for real objects. In some implementations, the locations can be determined using a geographical location and/or description for one or more real objects. For example, it would be understood that a real object depicting the Eiffel Tower would convey the placement of other surrounding real objects such that corresponding locations for one or more determined first and/or second virtual objects can be determined. In some implementations, the creation system can determine the relative locations for first and/or second virtual objects according to one or more user-selected locations for those objects. In some implementations, relative locations for first and/or second virtual objects can be determined according to a combination of the above methods.

Once having determined relative locations for the one or more first and/or second virtual objects, the creation system can compile these objects into an artificial reality environment according to their locations. Consequently, the creation system can present the artificial reality environment to a user to allow the user to experience virtuality of depictions provided by one or more source images.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., source photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing systems for generating artificial reality environments require manual creation and location selection of virtual objects. This can be particularly difficult if the user wants to recreate a real-world location, which requires specific objects and precise placement to accurately represent the location. As such, depictions for virtual objects in these existing system is sometimes deficient such that a real to virtual object correspondence is substantially skewed and/or requires significantly time and technical expertise to create accurately create.

In contrast, implementations of the creation system according to the present technology are expected to overcome these deficiencies in existing systems via implementation of multi-level comparative analyses for achieving real to virtual object correspondence. On at least a first level, the creation system can select first virtual objects according to object identifiers corresponding to real objects for source images. The first virtual objects can be selected from a predetermined virtual object library where a criterion for selection can be a threshold level matching between a candidate first virtual object and an object identifier for a real object. In this way, the selection of virtual objects matching source images (e.g., of real-world locations) can be accomplished much more quickly and accurately than would be achieved by manual selections. On at least a second level, the creation system can recognize that the virtual object library is not enabled to supply an adequate first virtual object for a given object identifier. As a result, the creation system can then use one or more segmented, i.e., isolated, source image portions for one or more real objects that did not correspond to one or more selected first virtual objects. In particular, the creation system can use those image portions to generate respective second virtual objects. The generation of such second virtual objects can be made to include their associated depths according to a comparative analysis comparing previously determined depth profiles for real objects. Accordingly, the creation system herein can invoke each of the discussed first and second level comparative analyses to more aptly obtain virtual objects corresponding to source images, where a user only need supply the source images—without dedicating significant time or requiring special expertise. Since the creation system herein can be employed to invoke machine learning for generating each of its first and second virtual objects, a plethora of real to virtual object comparative analyses can be made automatedly and with increasing accuracy in view of continual training data. Further, by automatically placing the obtained virtual objects according to the source images (and potentially other contextual data) the creation system can generate the entire artificial reality environment, without requiring additional user input or time consuming and frustrating manual placement.

Several implementations are discussed below in more detail in reference to the figures. FIG. 1 is a block diagram illustrating an overview of devices on which some implementations of the disclosed technology can operate. The devices can comprise hardware components of a computing system 100 that creates an artificial reality environment by analyzing one or more source images for automatically creating corresponding elements in the artificial reality environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, artificial reality environment creation system 164, and other application programs 166. Memory 150 can also include data memory 170 that can include, e.g., source image data, training image data, depth profile data, image texture data, virtual object data, object location data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
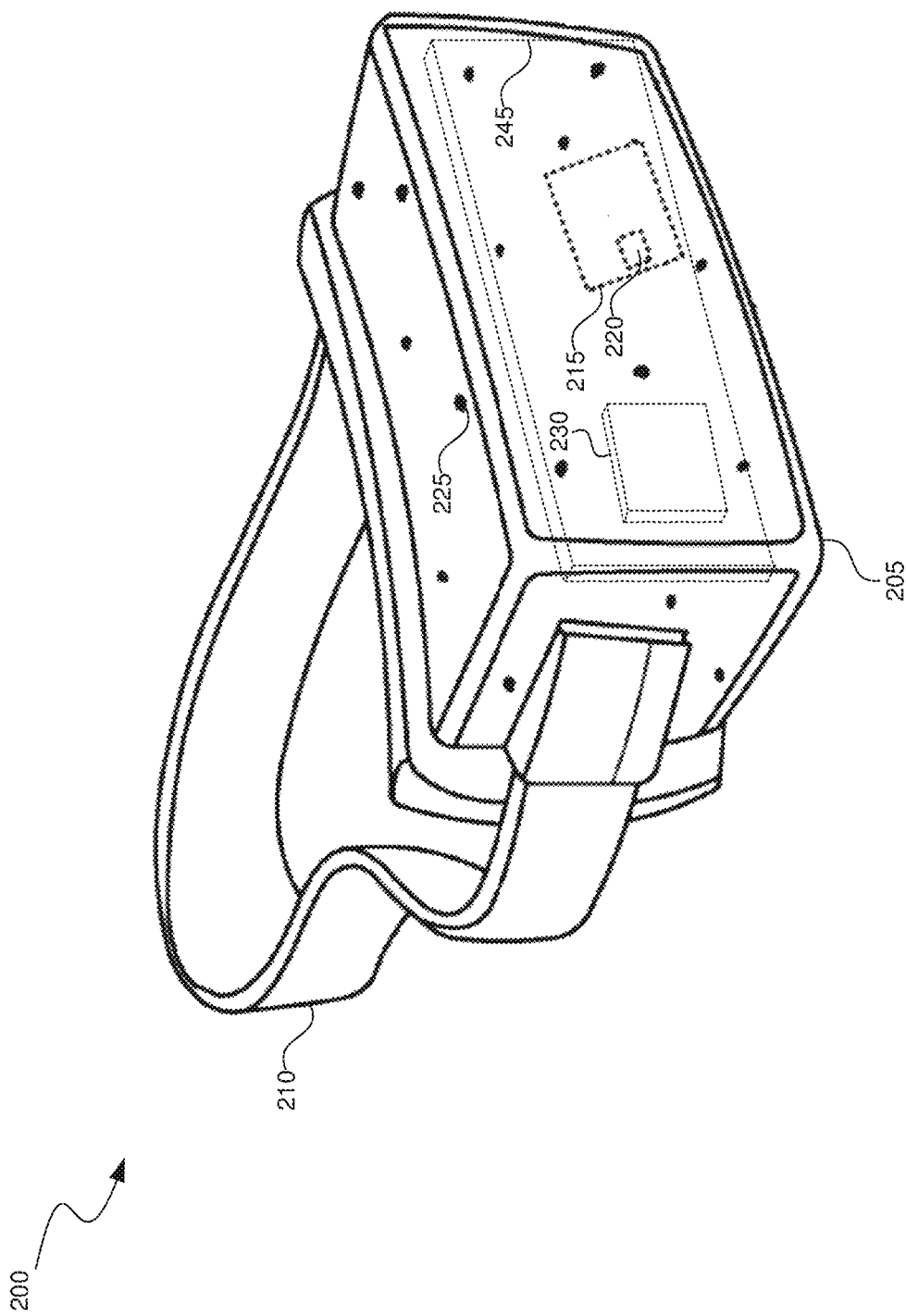
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
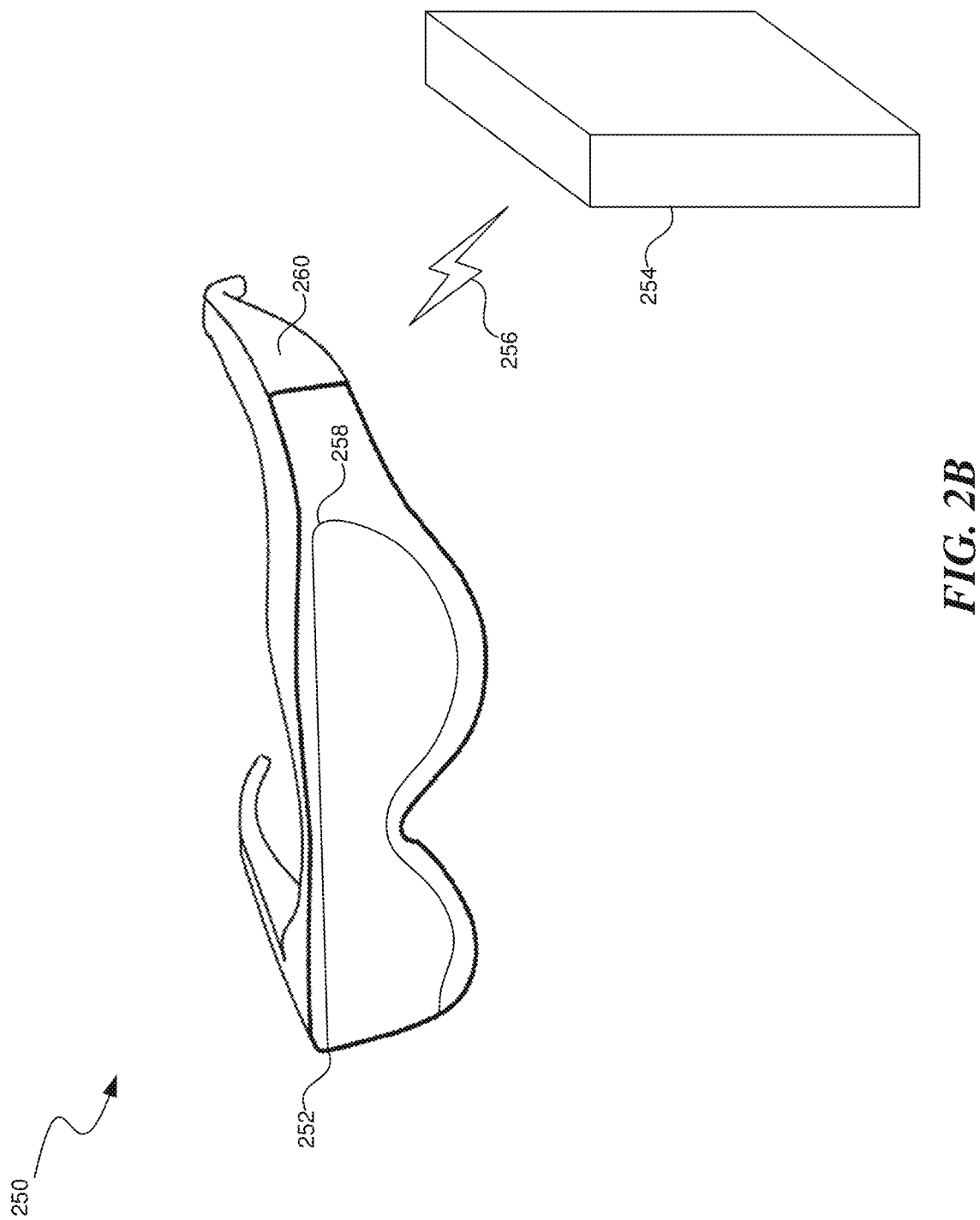
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other depicted objects.

Figure 2C:
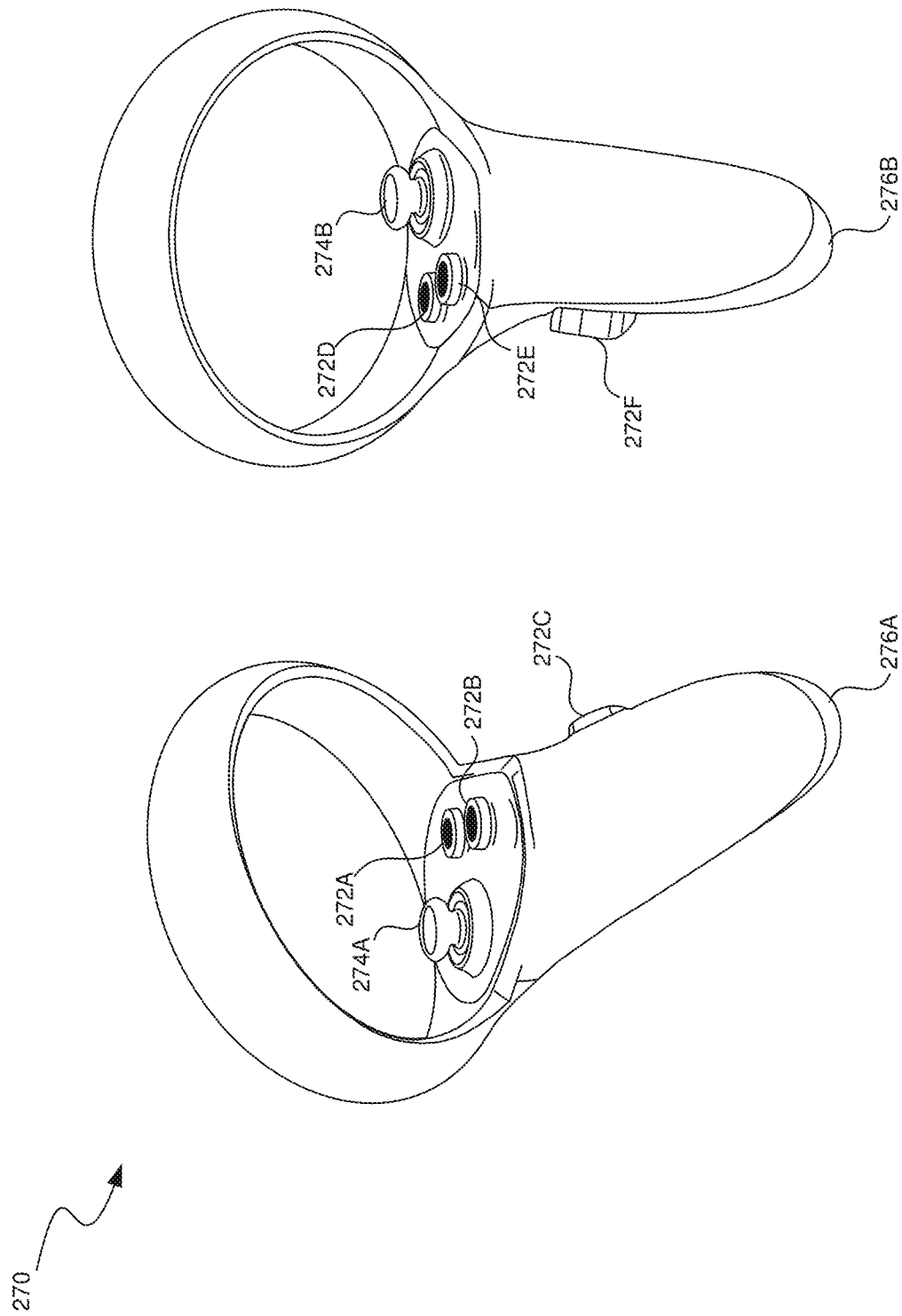
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
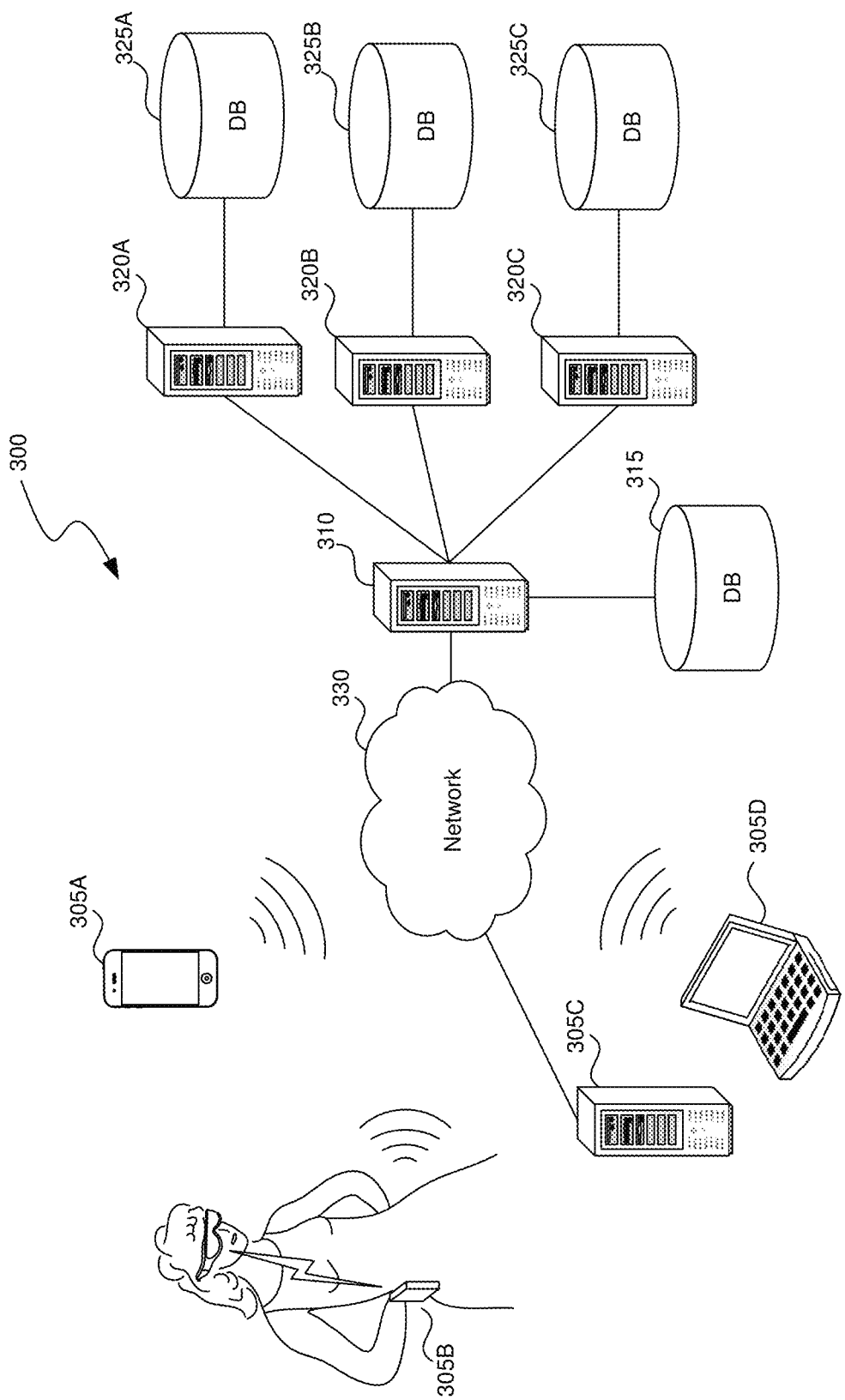
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
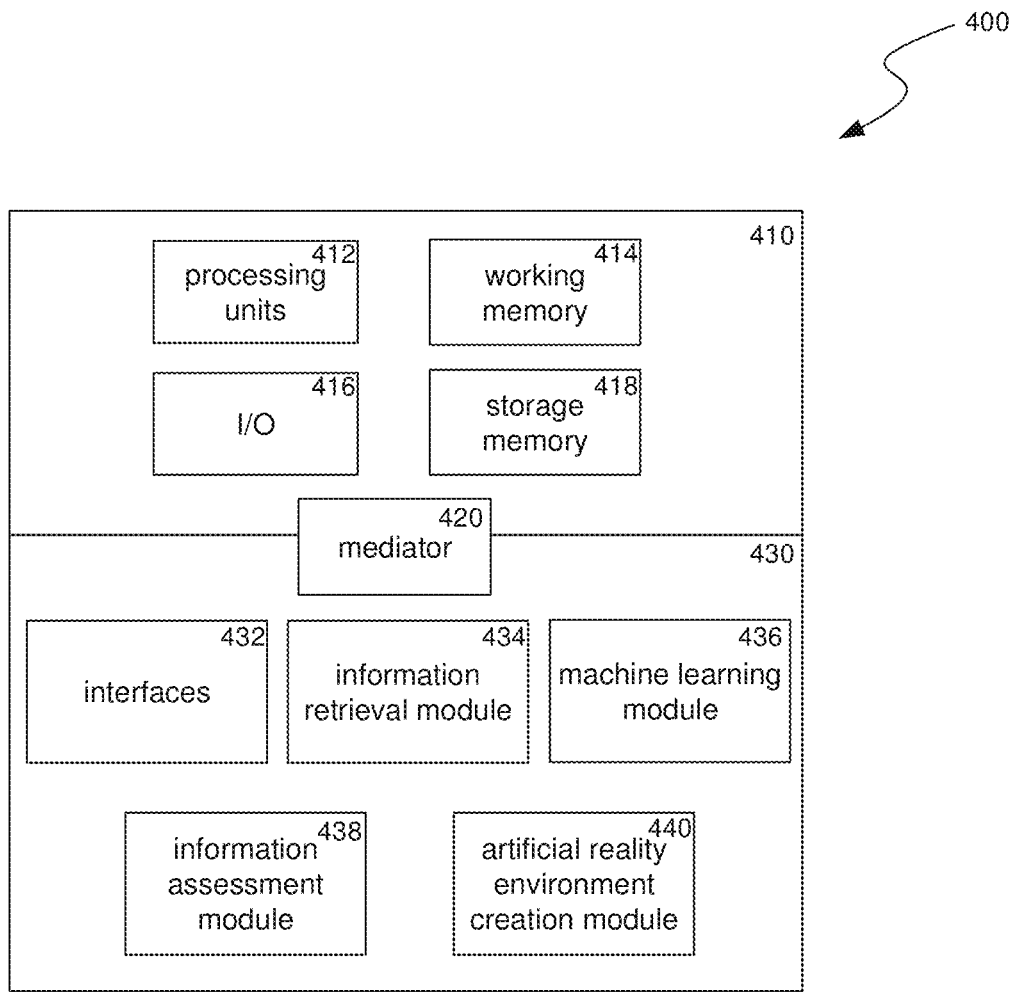
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for creating an artificial reality environment by analyzing one or more source images and automatically creating corresponding elements in the artificial reality environment. Specialized components 430 can include interfaces 432, an information retrieval module 434, a machine learning module 436, an information assessment module 438, an artificial reality environment creation module 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

In some implementations, information retrieval module 434 can obtain source images providing depicted objects, i.e., depicted object data, for which the creation system herein can automatically create corresponding virtual objects in an artificial reality environment. The source images can be provided from systems such as a user's cellphone, computer, vehicle, home entertainment system, a cloud storage system, social media platform, etc. The source images can be derived from, for example, one or more still photographs, video frames, drawings, etc. In some cases, the user can provide information such as recorded brainwaves, textual descriptions, conversations, etc., which the information retrieval module 434 can analyze and match to source images from an image repository. The source images may describe certain types of events, such as a vacation, a birthday party, a dream, a meeting, etc. Additional details on obtaining source images and their depicted objects are provided in relation to block 502 in FIG. 5.

In some implementations, machine learning module 436 can intake the depicted object data to generate object identifiers for the objects depicted in the source images. Alternatively or in addition, machine learning module 436 can generate depth profiles for the depicted objects. In each case, the machine learning module 436 can convert the depicted object data into machine learning model input. The machine learning module 436 can then apply the depicted object data to one or more trained machine learning models that can then generate the object identifiers and/or the depth profiles for the depicted objects. Additional details on generating the object identifiers are provided in relation to blocks 504 and 506 of FIG. 5, and on generating the depth profiles for the depicted objects in relation to block 604 of FIG. 6.

In some implementations, information assessment module 438 can, using the generated object identifiers, determine whether one or more of such identifiers correspond to one or more virtual objects in a virtual object library. If correspondence is found, information assessment module 438 can select the one or more corresponding virtual objects as respective first virtual objects that can each represent a depicted object. If correspondence is not found, information assessment module 438 can segment portions of the source images corresponding to depicted objects not corresponding to the selected first virtual objects. Using this segments, information assessment module 438 can feed such segments to the one or more trained machine learning models to determine a depth profile for corresponding depicted objects defined by the segmented input. Accordingly, this depth data can then be used to generate 3D meshes of the depicted objects, thus defining second virtual objects for respective depicted objects not corresponding to the selected first virtual objects. In some implementations, information assessment module 438 can analyze corresponding portions of the one or more source images for the second virtual objects to generate a texture therefor. Thereafter, information assessment module 438 can apply the generated texture to the built 3D model for one or more second virtual objects to arrive at a representation of a corresponding one or more of depicted objects. Additional details on determining correspondence for first virtual objects are provided in relation to block 508 of FIG. 5, on building one or more 3D models for second virtual objects in relation to block 514 of FIG. 5 and blocks 602 and 604 of FIG. 6, and on generating and applying a texture for second virtual objects are provided in relation to blocks 606 and 608 of FIG. 6.

In some implementations, information assessment module 438 can determine and apply a style for one or more first and/or second virtual objects. The style can represent a desired perspective in which the virtual objects are to be viewed and/or understood. In this regard, the style can represent, for example, an emotion, a range of emotions, a type of architecture, a design or artistic style, a time period to be expressed by the objects, etc. In some implementations, the style can be a style which was originally presented by one or more source images corresponding to the first and/or second virtual objects. In other implementations, the style can be a user-selected style. The style can be applied by selecting a model from a set matching the style, applying a filter to morph the model into that style, reskinning the model with a texture for that style, etc. Additional details on determining and applying a style for first and/or second virtual objects are provided in relation to blocks 516 and 518 of FIG. 5.

In some implementations, information assessment module 438 can determine relative locations for each of the one or more virtual objects (whether the first or second). For example, the locations can be determined by (a) analyzing relative placement for those depicted objects in one or more photographs or between multiple video frames, (b) using content item metadata associated with the one or more source images for real objects, and/or (c) using a geographical location and/or description for one or more depicted objects. In some implementations, the relative locations for virtual objects can be determined according to one or more user-selected locations for those objects. In some implementations, relative locations for virtual objects can be determined according to a combination of the above methods. Additional details on determining relative locations for virtual objects are provided in relation to block 520 of FIG. 5.

In some implementations, artificial reality environment creation module 440 can compile the one or first and/or second virtual objects, according to their determined relative locations, into an artificial reality environment. Additional details on compiling first and/or second virtual objects into an artificial reality environment are provided in relation to block 522 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
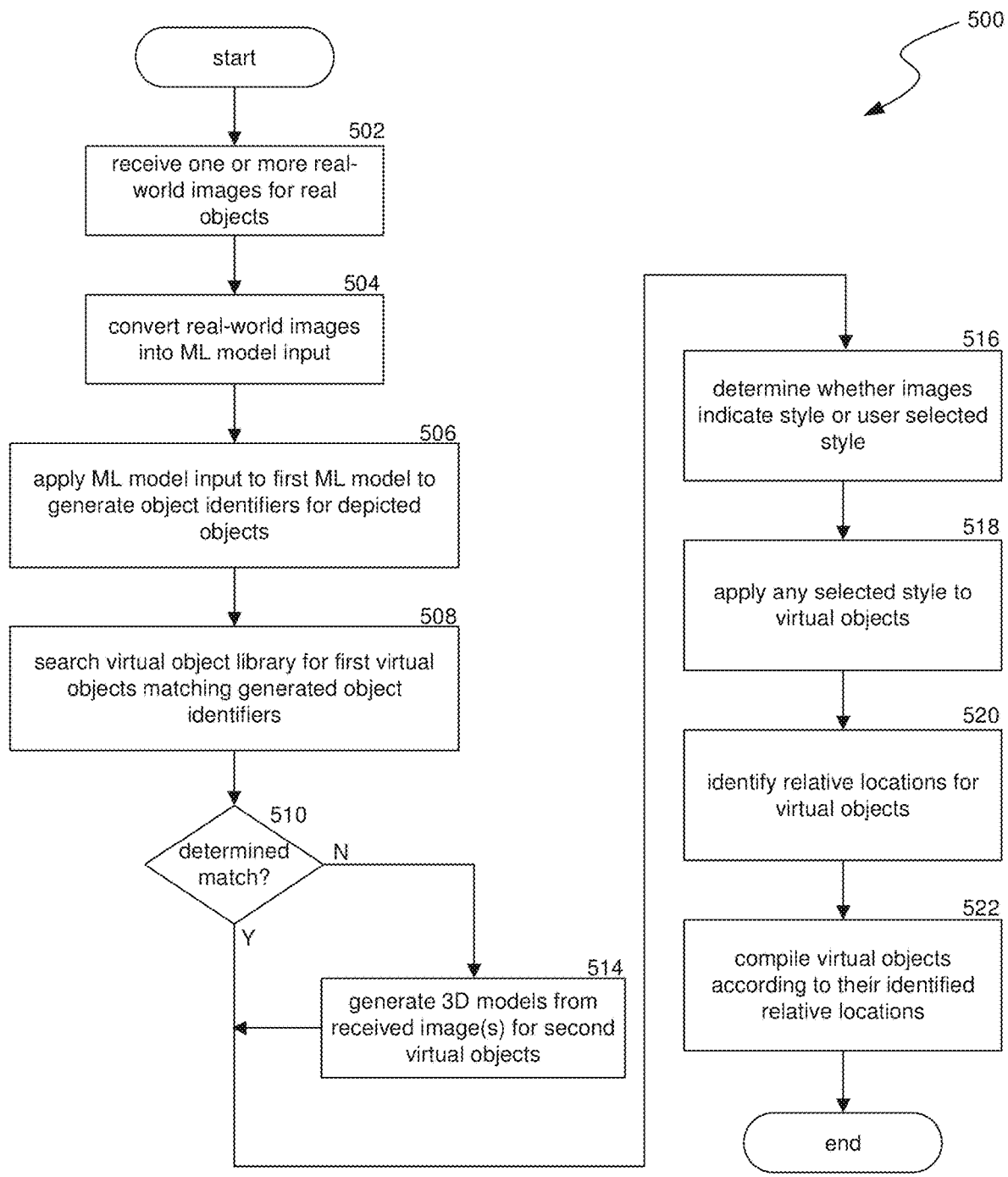
FIG. 5 is a flow diagram illustrating a process used in some implementations of the present technology for automatically creating an artificial reality environment.

FIG. 5 is a flow diagram illustrating a process 500 used in some implementations for automatically creating an artificial reality environment. In some implementations, process 500 can be initiated by a user executing a program to create an artificial reality environment. In some implementations, process 500 can be performed on a server system in control of that artificial reality environment; while in some cases all or parts of process 500 can be performed on an artificial reality client device.

At block 502, process 500 can receive one or more source images for depicted objects. The source images depict objects such as persons, vehicles, buildings, landmarks, etc. Process 500 can receive such images via manual or automatic upload from a user's cellphone, computer, vehicle, home entertainment system, social media account, designation of a URL, cloud storage system, etc. For example, a user may designate an album containing a set of image from her recent vacation, requesting that the images be made into an artificial reality environment.

At block 504, process 500 can convert the received source images into machine learning model input. For example, the machine learning model can be configured to receive histograms representations of the source images or other numerical representations of the images, and process 500 can convert the receives source images into that numerical format.

At block 506, process 500 can apply the machine learning model input to a first machine learning model trained to generate object identifiers for depicted objects, as well as for one or more scenes corresponding to the depicted objects. A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. Examples of models include: neural networks (traditional, deeps, convolution neural network (CSS), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats.

The first machine learning model can be trained using training data of images with portions tagged with object and scene identifiers (hereinafter collectively "object identifiers"). More specifically, each item of the training data can include an instance of an image matched to one or more object identifiers for objects depicted in that image. In this regard, the one or more object identifiers can each define semantic tags as labels for portions of images, e.g., a type of structure such as building, a type of vegetation such as a tree, etc. During the model training, a representation of the image data (e.g., histograms of the images) can be provided to the model. Then, the output from the model, i.e., predicted object identifiers from the model, can be compared to the actual objects identified in the images and, based on the comparison, the model can be modified, such as by changing weights between nodes of the neural network or parameters of the functions used at each node in the neural network (e.g., applying a loss function). After applying each of the pairings of the inputs (images) and the desired outputs (object identifiers) in the training data and modifying the model in this manner, the model is trained to evaluate new instances of source images in order to generate corresponding object identifiers.

At block 508, process 500 can search a virtual object library and select first virtual objects and scenes matching the generated object identifiers for the depicted objects and scenes. In some implementations, process 500 can exclude from the search object identifiers that have been determined to be for objects that are transient in nature (e.g., vehicles, persons, object below a threshold size, etc.) Thus, the selected first virtual objects may exclude those that do not make up permanent parts of the world depicted in the source images. The virtual object library that is searched can be predetermined. That is, the virtual object library can be pre-populated with 3D models for objects with corresponding metadata that can be matched to object identifiers.

At block 510, process 500 can determine whether the search conducted at block 508 has yielded a match for all the objects and scenes (e.g., a birthday party, a sunny beach, etc.) depicted in the source images (e.g., whether each depicted object and scene, which has had one or more identifiers assigned at block 506, returned a match with a match score above a match threshold).

In response to process 500 determining that one or more (non-transitory) objects depicted in the source images did not sufficiently match any virtual object in the library, process 500 can, at block 514, create one or more second virtual objects by generating respective 3D models therefor. That is, the one or more of second virtual objects to be generated can respectively represent one or more depicted objects that did not correspond to any selected first virtual object. Process 500 can accomplish this by estimating depth data for the depicted object (if not encoded with the source image(s)), generate a 3D model from the depth data, and skin a texture onto the 3D model from color data in the source images. Additional details on generating such second virtual objects are discussed below in relation to FIG. 6.

Having obtained the first and/or second virtual objects for the depicted (non-transitory) objects in the source images, process 500 can, at block 516, determine whether such source images indicate, or a user selection has been made, for a style. That is, process 500 can determine whether the depicted objects for those images are defined by a certain design, art form, timeframe, etc. in which the virtual objects are to be viewed and/or understood. For instance, the style can represent an emotion, a range of emotions, an architectural style, a time period to be expressed by the objects, etc. In particular, process 500 can, via information assessment module 438 for example, cross-reference the depicted objects with styles presented in a look-up table of styles. For example, process 500 can distinguish a building style as being either colonial or contemporary. Alternatively or in addition, process 500 can determine whether a user has selected a particular style in which the first and/or second virtual objects ought to be presented when interacting within an artificial reality environment. For example, the particular style can be a cartoon style, a whimsical style, a serious style, a Picasso style, a style according to a particular time era, etc. In some cases, the selected particular style can be a combination of multiple styles.

At block 518, process 500 can apply the selected style to the one or more first and/or second virtual objects to achieve either an image indicated style or a user selected style. For instance, process 500 can apply a filter to the selected objects or the objects can be part of a set defined in multiple styles and the one matching the selected style can be used.

At block 520, process 500 can identify relative locations for the obtained one or more first and/or second virtual objects. In some implementations, such locations can be identified by using location data for the depicted objects corresponding to these virtual objects. For example, process 500 can determine relative locations for depicted objects in an image or across multiple images or video frames. As a more specific example, process 500 can apply the machine learning model discussed above to determine depth data for the depicted objects and derive positions for the virtual objects according to the depth data for their corresponding depicted objects. In addition, process 500 can view relative distances between the depicted objects and estimate their corresponding geographical positions. As another example, process 500 can determine location information for one or more virtual objects by analyzing associated source image metadata (e.g., GPS data, city data, etc.) For example, if a first image depicting London bridge has a first set of GPS coordinates and a second image depicting Big Ben has a second set of GPS coordinates, these can be used to help place the corresponding virtual objects for these depicted objects. In some implementations, process 500 can identify relative locations for one or more of the virtual objects by identifying the depicted objects and using known mapping locations for those depicted objects. For instance, if the two of the first and/or second virtual objects are identified as famous landmarks, process 500 can associate the relative locations of those landmarks on a map the locations for the corresponding virtual objects. In some implementations, process 500 can determine the relative locations for first and/or second virtual objects according to one or more user-selected locations for those objects. For example, a user may specify a location for a virtual object or update the location of a virtual object after process 500 has initially placed it in the artificial reality environment. In some cases, when a location for at virtual object is not found from the above processes, a next available open location (e.g., with a size sufficient to hold the virtual object) in the artificial reality environment can be selected. In some implementations, process 500 can identify the relative locations for one or more of the first and/or second virtual objects by using a combination of the just discussed exemplary methods.

At block 522, process 500 can compile first and/or second virtual objects according to their identified relative locations for positioning within an artificial reality environment. In some cases, this can include reducing the space between virtual objects to fit in the artificial reality environment, while keeping the relative directions between the virtual objects consistent from their defined locations. As a result, a user can be presented with the opportunity to interact within the artificial reality environment so as to experience the virtuality of depictions provided by source images for which the first and/or second virtual objects correspond. Block 522 can also include identifying and applying various other environment elements, such as selecting a cube map or other background feature matching the source image(s) and applying it to the artificial reality environment, identifying weather elements (e.g., rain, wind, snow, etc.) and applying them to the artificial reality environment, identifying lighting conditions (e.g., night, evening, overcast, sunny) and applying them to the artificial reality environment, etc.

Figure 6:
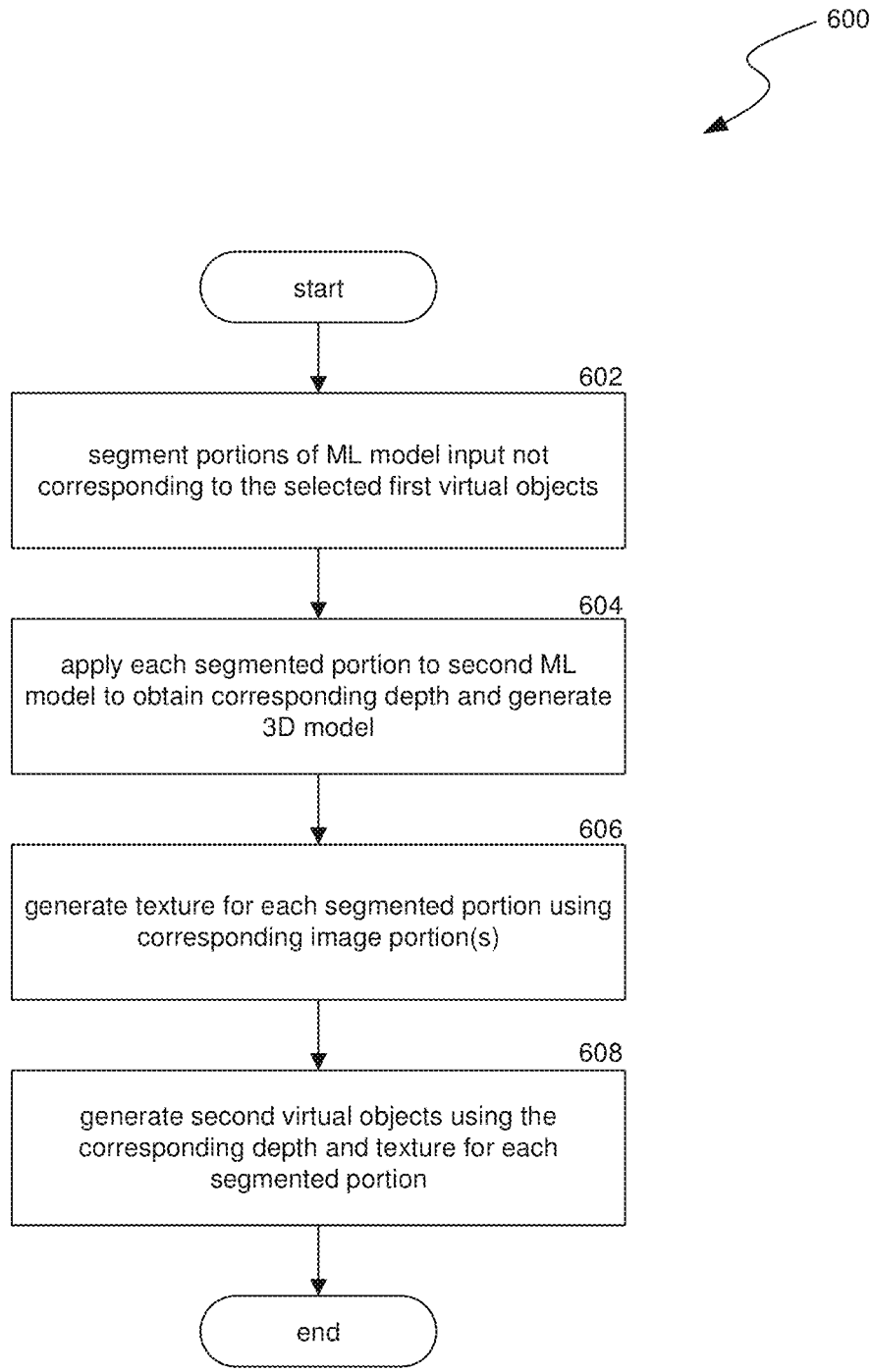
FIG. 6 is a flow diagram illustrating a process used in some implementations of the present technology for generating one or more virtual objects which can be included in an artificial reality environment.

FIG. 6 is a flow diagram illustrating a process 600 used in some implementations of the present technology for generating one or more virtual objects which can be included in an artificial reality environment. Process 600 can be performed in response to process 500 of FIG. 5 determining that one or more depicted objects of source images received by process 500 do not correspond to any first virtual object selected from the virtual object library discussed with reference to blocks 508 and 510 of FIG. 5.

As previously discussed, process 500 of FIG. 5 can generate one or more second virtual objects for respective depicted objects not corresponding to selected first virtual objects. To do so, process 600 of FIG. 6 can, at block 602, segment those portions of the source images to get a portion depicting just the object to be generated, and can convert that portion into machine learning model input (such as a histogram). In some implementations, the segmenting is performed after depth data is estimated for the entire image at block 604.

At block 604, process 600 can apply the segmented portion (or entire image) to a machine learning model trained to produce a corresponding depth data therefor. This machine learning model can be trained with supervised learning and use training data that can be obtained from a multitude of prior training images. More specifically, each item of the training data can include an instance of a flat source image (e.g., an image taken with a traditional camera or with a depth-enabled camera where depth channel(s) are removed) or portion of a source image matched to one or more depth profiles (e.g., the same image taken with a depth-enabled camera). During the model training, a representation of the image data (e.g., histograms of the objects) can be provided to the model. Then, the output from the model, i.e., predicted object depth profiles, can be compared to the actual depths for depicted objects and, based on the comparison, the model can be modified, such as by changing weights between nodes of the neural network or parameters of the functions used at each node in the neural network (e.g., applying a loss function). After applying each of the pairings of the inputs (prior training images) and the desired outputs (depth profiles) in the training data and modifying the model in this manner, the model is trained to evaluate new instances of source images in order to generate depth profiles for new instances of depicted objects for corresponding 3D models for second virtual objects. As noted above, in some cases the depth images are segmented into the depicted objects after depth estimation. In some cases, the source images are taken with a depth enabled camera, and thus no depth estimation is needed.

Once the depth data is obtained for a portion of a source image depicting an object, process 600 can convert the depth data into a 3D mesh. The depth data defines a distance from a capture device for each pixel. From this data, process 600 can determine the relative distances between each pixel (using simple mathematical transformations), e.g., mapping each pixel as a point in a 3D space. Thus, the depth data can be used to generate the mesh, by defining points, curves, planes, etc., according to the defined points in 3D space. In some implementations, process 600 can use the depth data to complete generation of the 3D mesh for recognized image objects, i.e., by defining points, curves, planes, etc., to supply occluded perspectives for an object. In some implementations, there are multiple source images depicting the same depicted object from multiple angles. The depth data from these multiple source images can be used in combination by mapping the source images into a common coordinate system so each depth point, from the different images, is relative to the same origin point. Process 600 can then perform the transformations to generate the 3D mesh from the multiple source images.

At block 606, process 600 can generate, for each segmented portion of machine learning model input that has been used to generate a 3D mesh at block 604, a corresponding texture. Process 600 can extract such texture from those portions of received source image(s) that depict the object and use (at block 608) that data to generate a color/texture that process 600 skins onto the 3D mesh. That is, such associated texture(s) can be skinned onto a 3D model for a second virtual object. The generated and skinned 3D mesh can be returned, continuing back to block 514 of FIG. 5.

Figure 7A:
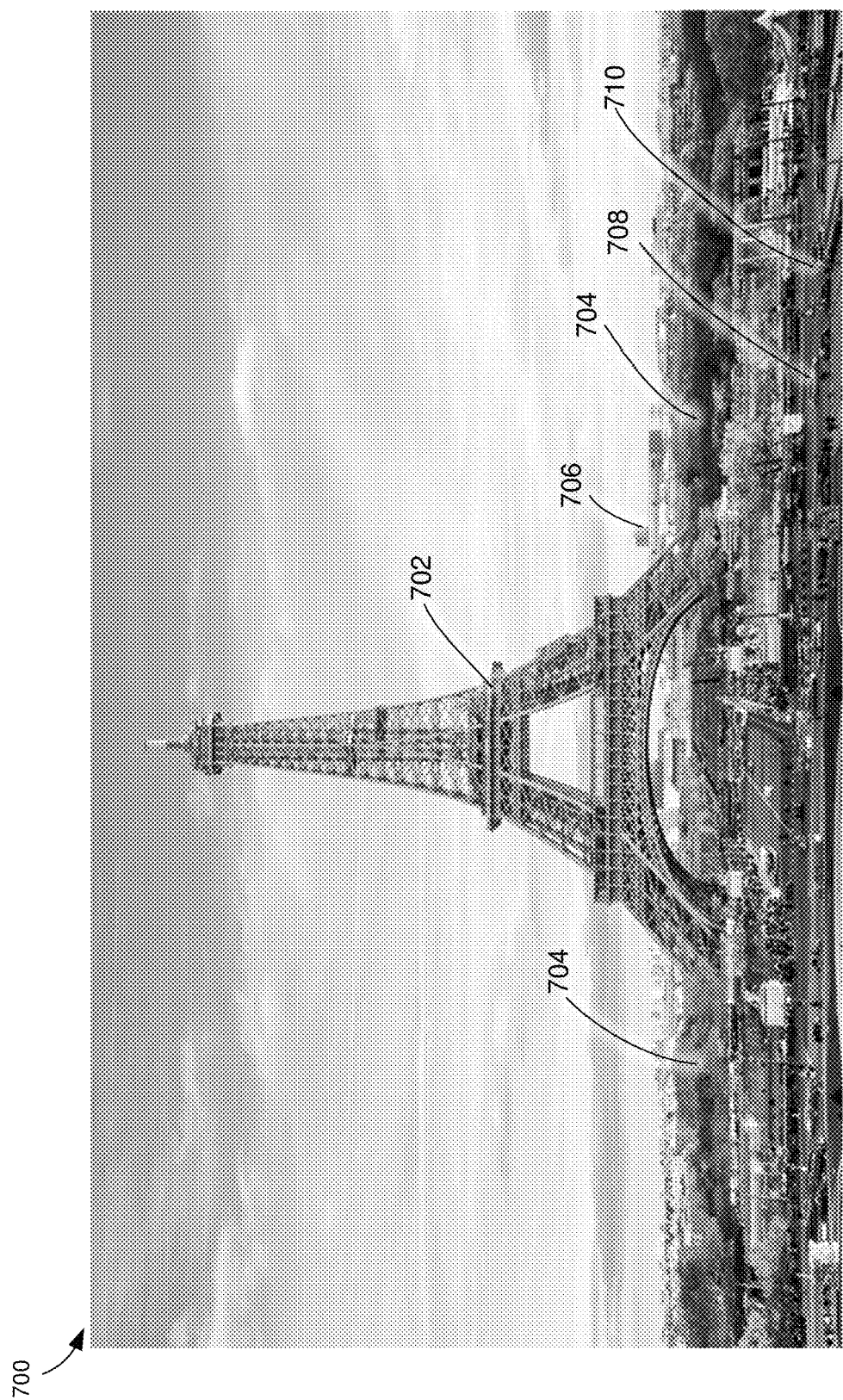
FIG. 7A is a source image on which implementations of the present technology can operate.

FIG. 7A is a source image 700 on which implementations of the present technology can operate. In particular, the source image 700 depicts the landmark Eiffel Tower 702 in Paris, France and surrounding vegetation 704, buildings 706, and roadway 710. In the foreground, passing vehicles 708 are also shown as may be the case on any given day.

Figure 7B:
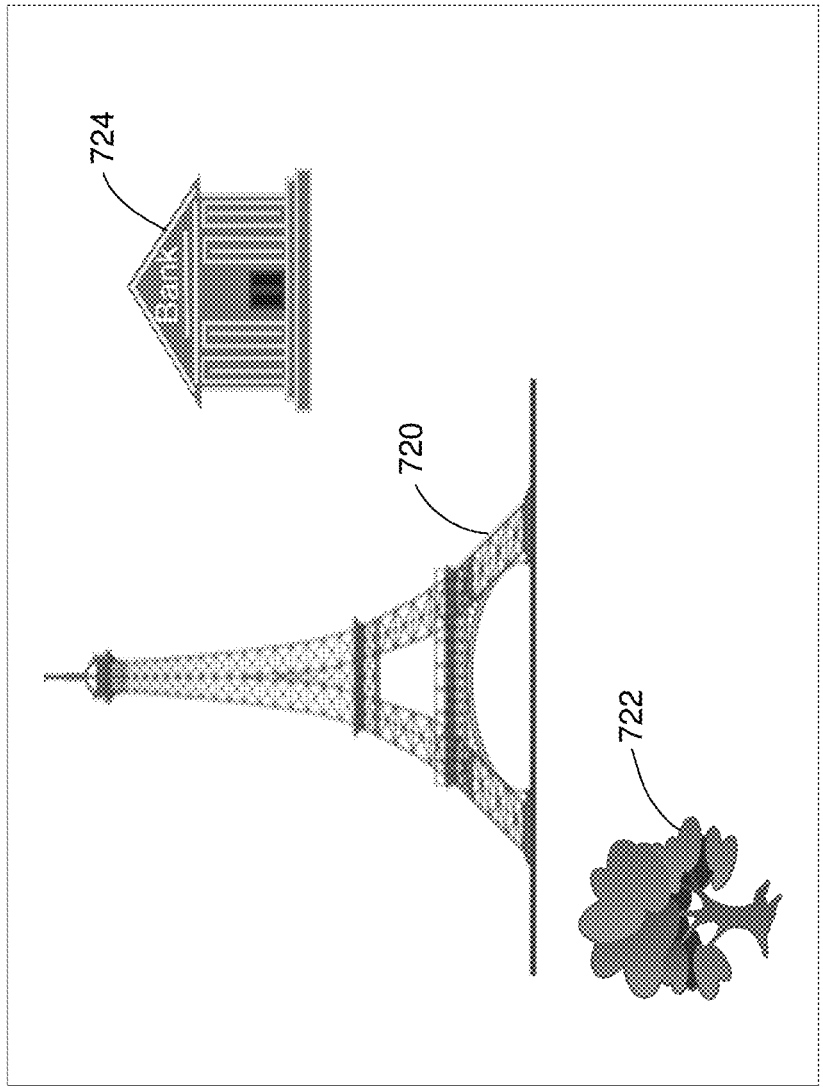
FIG. 7B is an illustration of virtual objects generated from the source image of FIG. 7A according to implementations of the present technology.

FIG. 7B is an illustration of virtual objects generated from the source image of FIG. 7A, according to implementations of the present technology. As can be appreciated, one or more of the depicted objects can be a first or a second virtual object according to the implementations of the present technology. For example, object 720 and object 724 can be first virtual objects selected from the virtual object library discussed herein, while object 722 can be a second virtual object for which depth had been predicted and texture applied. No virtual objects for vehicle 708 was generates as this was identified as a transient object.

Figure 7C:
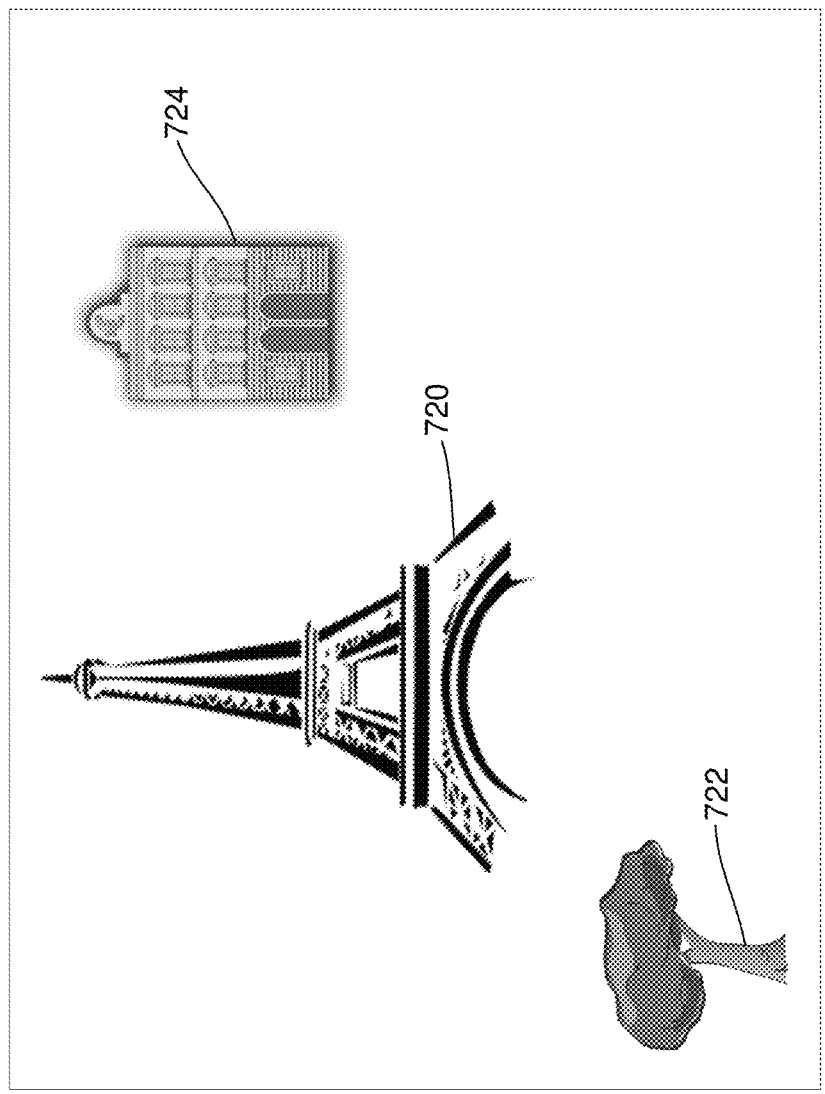
FIG. 7C is an illustration of the virtual objects of FIG. 7B according to a user-selected style.

FIG. 7C is an illustration of the virtual objects of FIG. 7B according to a user-selected styles. For instance, process 500 of FIG. 5 has received user style selections from a set of filters, and those filters have been applied to each of the virtual objects 720, 722, and 724. In particular, object 720 has been styled to reflect a modernist approach to architecture, object 722 has been styled to reflect Georgian design, and object 724 styled to reflect a contemporary perspective.

Figure 7D:
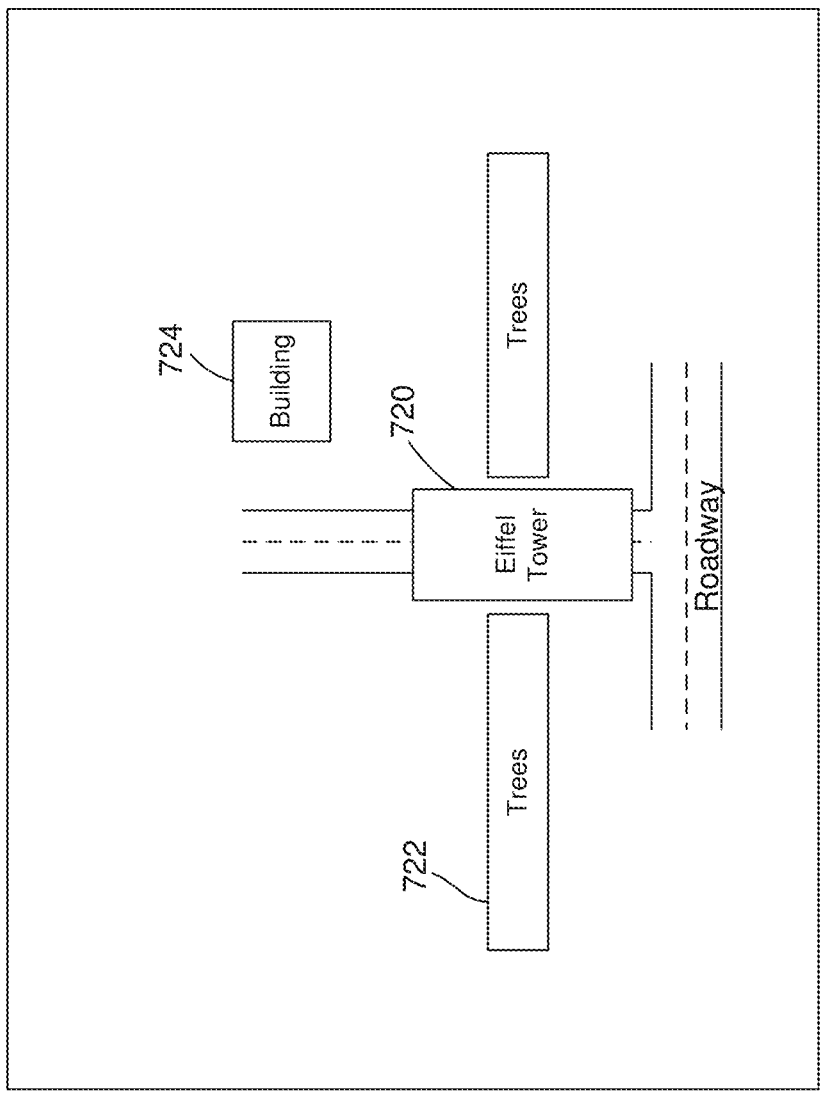
FIG. 7D is a top-down view of an artificial reality environment for the source image of FIG. 7A.

FIG. 7D is a top-down view of an artificial reality environment for the source image of FIG. 7A, depicting locations identified for the obtained virtual objects 720, 722, and 724. In particular, FIG. 7D shows the relative positioning for virtual objects 720, 722, and 724 as determined from source image 700. As can be understood by reference to the above discussion of block 520 of FIG. 5, the virtual objects can also be positioned according to a real-world location for the identified landmark Eiffel Tower. Consequently, the virtuality for a source image depiction such as that shown in FIG. 7A can be approximated to most closely match real-world locations for virtual objects. A roadway, corresponding to depicted roadway 710 has also been added according to known objects around the know Eiffel Tower landmark.

Figure 7E:
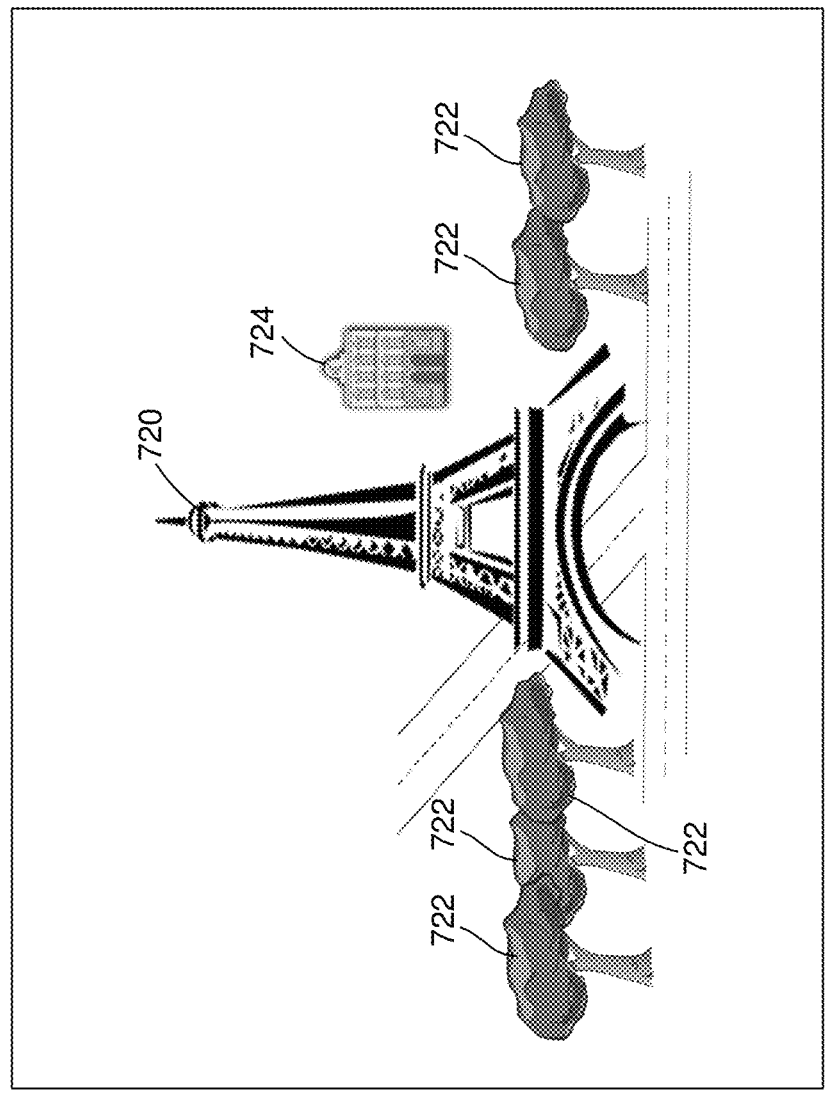
FIG. 7E is a view into the artificial reality environment as defined by the virtual objects of FIGS. 7C and 7D.

FIG. 7E is a view into the artificial reality environment 750 generated by positioning the virtual objects 720, 722, and 724 (with their user-selected styles) into an artificial reality environment with properties such as a background matching the source images (as discussed in relation to block 522).

Figure 8:
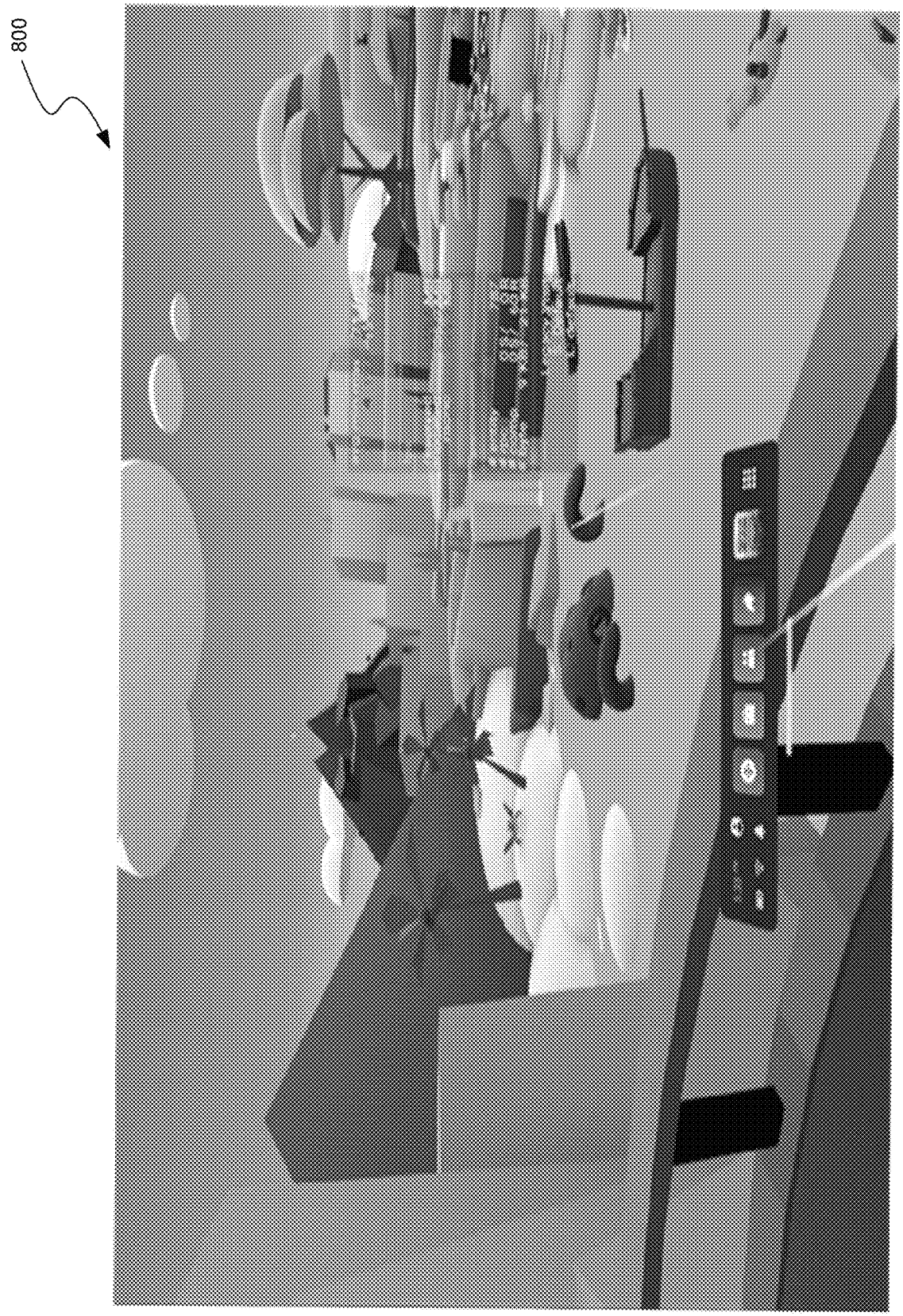
FIG. 8 is a conceptual diagram illustrating an example virtual reality world automatically created from a series of source images.

FIG. 8 is a conceptual diagram illustrating another exemplary artificial reality environment 800 automatically created from a series of source images. FIG. 7 includes simplified objects and an environment for ease of illustration. Example 800 illustrates a more full-featured representation of an artificial reality environment that can be generated using process 500. In example 800, process 500 has recognized in the provided images a mountain, a beach, a volcano, a waterfall, a boat, etc. and has created similar elements in the artificial reality environment, with positions determined based on the relative positions in the images and relationships between the images (e.g., a determination of how the images map to the real-world).

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method of generating an artificial reality environment, the method comprising:
    receiving one or more source images with depicted objects;
    converting the one or more source images into machine learning model input,
        wherein the converting the one or more source images into machine learning model input comprises excluding from the input at least one object, depicted in the one or more source images, identified as transient;
    generating object identifiers for one or more of the depicted objects by applying the machine learning model input to a first machine learning model trained to match image data to object identifiers;
    selecting one or more first virtual objects, from a virtual object library, that match at least one of the object identifiers;
    creating one or more second virtual objects, for one or more of the depicted objects that do not correspond to the selected one or more first virtual objects, by:
        generating a 3D model, for each of the at least one second virtual objects, by applying at least portions of representations of the one or more source images to a second machine learning model trained to predict depth for the corresponding depicted objects and converting at least a part of depth data produced by the second machine learning model into a 3D mesh; and
        applying a texture for each of the of the at least one second virtual objects based on the corresponding portions of the one or more source images;
    identifying relative locations for each of the one or more first virtual objects and the one or more second virtual objects; and
    compiling the one or more first virtual objects and the one or more second virtual objects, based on the identified relative locations, into the artificial reality environment.

2. The method of claim 1,
    wherein the one or more source images are one or more of (a) a photograph, (b) a video frame, (c) a drawing, or (d) any combination thereof.

3. The method of claim 1,
    wherein the selecting one or more first virtual objects comprises matching the object identifiers to tags defined for candidate virtual objects in the virtual object library.

4. The method of claim 1,
    wherein the one or more source images comprises a plurality of images derived from a plurality of photographs and/or video frames; and
    wherein a relative location of one or more of the first and/or second virtual objects is determined based on one or more of (q) a determination of relative positioning of the depicted objects included in the plurality of photographs and/or video frames, (r) image metadata for one or more of the plurality of photographs and/or video frames, (s) an identification of at least one of the depicted objects as related to a mapped object with a known geographical position, (t) a location selected by a user, or (u) any combination thereof.

5. A computing system for generating an artificial reality environment, the computing system comprising:
    one or more processors; and
    one or more memories storing instructions that, when executed by the one or more processors, cause the computing system to perform a process comprising:
        receiving one or more source images with depicted objects;
        selecting one or more first virtual objects, from a virtual object library, that match at least one of the depicted objects;
        creating one or more second virtual objects, for one or more of the depicted objects that do not correspond to the one or more first virtual objects, by:
            generating a 3D model, for each of the at least one second virtual objects; and
            applying a texture for each of the of the at least one second virtual objects based on the corresponding portions of the one or more source images;
        identifying relative locations for each of the first and second virtual objects; and
        compiling the first and second virtual objects, based on the identified relative locations, into the artificial reality environment,
        wherein the first and second virtual objects exclude one or more of the depicted objects identified as being transient.

6. The computing system of claim 5,
wherein the process further comprises generating object identifiers for one or more of the depicted objects by applying the machine learning model input to a first machine learning model trained to match image data to object identifiers; and
wherein each of the one or more first virtual objects is selected from the virtual object library by matching the object identifiers for a depicted to tags on virtual objects in the virtual object library.

7. The computing system of claim 5,
wherein the generating the 3D model, for each of the at least one second virtual objects, is performed by applying at least portions of representations of the one or more source images to a second machine learning model trained to predict depth for the corresponding depicted objects and converting at least a part of depth data produced by the second machine learning model into a 3D mesh.

8. The computing system of claim 7,
wherein the second machine learning model is trained to predict depth for portions of images based on training data comprising flat images paired with corresponding depth profiles.

9. The computing system of claim 5,
wherein the texture is generated based on portions of the one or more source images respectively corresponding to each of the second virtual objects.

10. The computing system of claim 5,
wherein the one or more source images are one or more of a photograph, a video frame, a drawing, or any combination thereof.

11. The computing system of claim 5,
wherein the one or more source images comprises a plurality of images derived from a plurality of photographs and/or video frames; and
wherein a relative location of one or more of the first and/or second virtual objects is determined based on one or more of (q) a determination of relative positioning of the depicted objects included in the plurality of photographs and/or video frames, (r) image metadata for one or more of the plurality of photographs and/or video frames, (s) an identification of at least one of the depicted objects as related to a mapped object with a known geographical position, (t) a location selected by a user, or (u) any combination thereof.

12. A non-transitory machine-readable storage medium having machine-executable instructions stored thereon that, when executed by one or more processors, cause the one or more processors to perform a method for generating an artificial reality environment, the method comprising:
receiving one or more source images with depicted objects;
selecting one or more first virtual objects, from a virtual object library, that match at least one of the depicted objects;
creating one or more second virtual objects, for one or more of the depicted objects that do not correspond to the one or more first virtual objects, by:
generating a 3D model, for each of the at least one second virtual objects; and
applying a texture for each of the of the at least one second virtual objects based on the corresponding portions of the one or more source images;
identifying relative locations for each of the first and second virtual objects; and
compiling the first and second virtual objects, based on the identified relative locations, into the artificial reality environment,
wherein the first and second virtual objects exclude one or more of the depicted objects identified as being transient.

13. The non-transitory machine-readable storage medium of claim 12,
wherein the method further comprises generating object identifiers for one or more of the depicted objects by applying the machine learning model input to a first machine learning model trained to match image data to object identifiers; and
wherein each of the one or more first virtual objects is selected from the virtual object library by matching the object identifiers for a depicted to tags on virtual objects in the virtual object library.

14. The non-transitory machine-readable storage medium of claim 12,
wherein the generating the 3D model, for each of the at least one second virtual objects, is performed by applying at least portions of representations of the one or more source images to a second machine learning model trained to predict depth for the corresponding depicted objects and converting at least a part of depth data produced by the second machine learning model into a 3D mesh.

15. The non-transitory machine-readable storage medium of claim 14,
wherein the second machine learning model is trained to predict depth for portions of images based on training data comprising flat images paired with corresponding depth profiles.

16. The non-transitory machine-readable storage medium of claim 12,
wherein the texture is generated based on portions of the one or more source images respectively corresponding to each of the second virtual objects.

17. The non-transitory machine-readable storage medium of claim 12,
wherein the one or more source images comprises a plurality of images derived from a plurality of photographs and/or video frames; and
wherein a relative location of one or more of the first and/or second virtual objects is determined based on one or more of (q) a determination of relative positioning of the depicted objects included in the plurality of photographs and/or video frames, (r) image metadata for one or more of the plurality of photographs and/or video frames, (s) an identification of at least one of the depicted objects as related to a mapped object with a known geographical position, (t) a location selected by a user, or (u) any combination thereof.

* * * * *